US012754582B2

(12) United States Patent
Palani

(10) Patent No.: US 12,754,582 B2
(45) Date of Patent: Oct. 6, 2026

(54) DIGITALLY ASSISTED LOW NOISE SUB IV CHOPPER LESS BANDGAP REFERENCE CIRCUIT

(71) Applicant: Indian Institute of Technology Delhi, Hauz Khas (IN)

(72) Inventor: Rakesh Kumar Palani, Hauz Khas (IN)

(73) Assignee: Indian Institute of Technology Delhi, Hauz Khas (IN)

( * ) Notice: Subject to any disclaimer, the term of this patent is extended or adjusted under 35 U.S.C. 154(b) by 169 days.

(21) Appl. No.: 18/896,402

(22) Filed: Sep. 25, 2024

(65) Prior Publication Data

US 2025/0103079 A1 Mar. 27, 2025

(51) Int. Cl.
*G05F 3/24* (2006.01)
*G05F 1/618* (2006.01)

(52) U.S. Cl.
CPC ................ *G05F 1/618* (2013.01); *G05F 3/24* (2013.01)

(58) Field of Classification Search
CPC ..... G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/468; G05F 1/46; G05F 1/461; G05F 1/575; G05F 1/465
See application file for complete search history.

(56) References Cited

U.S. PATENT DOCUMENTS

| | | | | |
|---|---|---|---|---|
| 11,470,272 | B1 * | 10/2022 | Xiao | H04N 25/778 |
| 2015/0063420 | A1 * | 3/2015 | Cho | G01K 7/01 374/170 |
| 2017/0255220 | A1 * | 9/2017 | Sivakumar | H03B 5/04 |
| 2019/0121381 | A1 * | 4/2019 | Jankowski | G01R 31/2896 |
| 2020/0117147 | A1 * | 4/2020 | Mercier | G04F 10/005 |
| 2022/0100220 | A1 * | 3/2022 | Mesgarani | G01K 7/01 |
| 2022/0311424 | A1 * | 9/2022 | Lee | G05F 3/30 |
| 2025/0070664 | A1 * | 2/2025 | Ledvina | H02M 3/156 |
| 2026/0023405 | A1 * | 1/2026 | Mohamed Aslam | G05F 3/262 |

* cited by examiner

*Primary Examiner* — Crystal L Hammond
*Assistant Examiner* — Nusrat Quddus
(74) *Attorney, Agent, or Firm* — Amster, Rothstein & Ebenstein LLP

(57) ABSTRACT

The present invention relates to a low-noise bandgap reference voltage generator (100) for generating constant bandgap reference voltage, bandgap generator (102) configured to provide a reference signal; voltage generator (108) configured to, generate low noise bandgap reference voltage, produce a complementary to absolute temperature voltage at a reference voltage; comparator (114) configured to compare reference signal generated and low noise bandgap reference voltage for generating control signal; a digital logic (116) configured to generate digital data, includes a binary search module (702) configured to perform a binary search on the digital data when the generator (100) initially powered, a random number module (708) configured to generate a random number, a counter (710) configured to count up to the random number and powered up the bandgap generator (102) and a linear search module (712) configured to generate digital data by performing linear search on digital data and method for the same.

6 Claims, 6 Drawing Sheets

DIGITALLY ASSISTED LOW NOISE SUB IV CHOPPER LESS BANDGAP REFERENCE CIRCUIT

CROSS-REFERENCE TO RELATED APPLICATIONS

This patent application claims the benefit and priority of Indian Patent Application number 202311064815, filed with the Indian Patent Office on Sep. 27, 2023, the disclosure of which is incorporated by reference herein in its entirety as part of the present application.

FIELD OF THE INVENTION

The present invention relates to a low noise reference voltage generator without using techniques like chopping. More particularly, the present invention relates to a digitally assisted low noise reference voltage generator.

BACKGROUND OF THE INVENTION

A bandgap voltage reference is a voltage reference circuit which is widely used in almost each and every SoC in today's world. The bandgap voltage reference circuit produces an almost constant voltage corresponding to the particular semiconductor's theoretical band gap, with very little fluctuations from variations of power supply, electrical load, time, temperature etc. However bandgap reference voltage can have noise which can affect the Signal to Noise ratio of subsequent signals. Conventionally, the low noise reference voltage in the CMOS technology is achieved by utilizing an analog techniques such as an off-chip filter or techniques like chopping. The conventional voltage reference circuit has limitations such as low cut-off filters demanding a larger area and chopping, resulting in a finite output ripple with an increase in the thermal noise floor.

Thus, there is a need of bandgap voltage references voltage generator to overcome the challenges associated with the conventional bandgap voltage reference generator.

OBJECTIVES OF THE INVENTION

The main objective of the present invention is to provide a low noise reference voltage generator without any ripple in the output of the same.

Another objective of the present invention is to develop a digital logic that does not interfere with regular operation of the low noise reference voltage generator.

SUMMARY OF THE INVENTION

The following summary is provided to facilitate an understanding of some innovative features unique to the disclosed embodiments and is not intended for the full description of the invention. A full appreciation of the various aspects of the preferred embodiments disclosed herein can be gained by taking the entire specification, claims, drawings, and abstract as a whole.

The present invention discloses a low-noise bandgap reference voltage generator for generating a constant low noise bandgap reference voltage. In an embodiment, the low-noise bandgap reference voltage generator includes a bandgap generator, a voltage generator, a comparator, a digital logic and power source.

In an embodiment, the bandgap generator includes a first switch configured to save a power consumption of the low-noise bandgap reference voltage generator, controlled by a controlling signal, and a bandgap circuit electrically connected to the first switch, configured to provide a reference signal.

In an embodiment, the voltage generator configured to generate the low noise bandgap reference voltage, and produce a complementary to absolute temperature (CTAT) voltage at a reference voltage.

In an embodiment, the comparator configured to compare the reference signal generated and the low noise bandgap reference voltage for generating the control signal.

In an embodiment, the digital logic generates digital data based on binary of linear search using a processor so that the output of the low noise bandgap reference and the reference signal are equal. Further processor also has a random number generator and a small wake up counter. This random generator along with the counter is responsible for the wake up of the reference signal generator followed by the linear search. This is done to save power on the reference generator.

In an embodiment, the low-noise bandgap reference voltage generator configured to result the noise spectral density up to 0.6 μV/√Hz at 1 Hz offset frequency for generating the constant bandgap reference voltage, and maintain the accuracy of the bandgap of 28 ppm/° C. in the temperature range of −20 to 125° C. The accuracy is dependent on the reference signal generator and it can be better if we choose the one which has better accuracy from literature like curvature compensated one.

In an embodiment, the voltage generator comprising a data converter configured to calibrate the low noise bandgap reference voltage by utilizing the reference voltage and digital data.

In an embodiment, the digital logic is configured to convert the received control signal into digital data of bits size 12, increase or decreases the value of the generated digital data linearly till the comparator output flipped.

In an embodiment, a method for a low noise bandgap reference voltage generation includes following steps (a) powering the generator by using the power source, (b) performing a binary search by using the binary search module. In an embodiment, the step (b) further includes waiting for a pre-defined setup time for settling of the reference signal, and setting the $i^{th}$ bit of the digital data, generating the low noise bandgap reference voltage based on the digital data and comparing the low noise bandgap reference voltage with the reference signal. If the reference signal less than the low noise bandgap reference voltage, the $i^{th}$ bit of the digital data configured to be reset; and if the reference signal greater than the low noise bandgap reference voltage, the $i^{th}$ bit of the digital data configured to be set; and comparing the place of the bit of the digital data generated with bit size N, including if bit place less than bit size then the binary search module configured to set the bit of the bit place to a logic value one, increase the place value of the bit of the digital data by one, and repeat the step b; and if bit place greater than bit size then the binary search module configured to perform a step c; (c) powering down the bandgap generator, generating a random number based on the digital data, and resetting the counter to initial state; (d) comparing the random number with the counter current logic state, including if the counter current logic state similar to the random number then powering up the bandgap generator; and if the counter current logic state dissimilar to the random number then the counter configured to change the logic state to the next logic state and the random number module configured to repeat the step d, (e) waiting for a pre-defined setup time for settling of the reference signal generated by the bandgap generator, (f) generating the low noise bandgap reference voltage based on the digital data; and (d) performing the linear search by using the linear search module. In an embodiment, the step (d) includes comparing the low noise bandgap reference voltage generated at the step f with the reference signal, including if the reference signal less than the low noise bandgap reference voltage then the digital logic configured to decrease the digital data by one, the digital data configured to be fed to the step c and the data converter configured to generate the low noise bandgap reference voltage based on the decreased digital data; if the reference signal greater than the low noise bandgap reference voltage then the digital logic configured to increase the digital data by one, the digital data configured to be fed to the step c. The data converter configured to generate the low noise bandgap reference voltage based on the increased digital data; and repeating the step g for at least two times.

In an embodiment, the pre-defined setup time is of 100 us for settling of the reference signal generated by the bandgap generator.

Other features and advantages of the present invention will become apparent from the detailed description, taken in conjunction with accompanying drawings which illustrate, by way of example, the principles of the invention

BRIEF DESCRIPTION OF THE DRAWINGS

The drawings described herein are for illustrative purposes only of selected embodiments and not all possible implementations and are not intended to limit the scope of the present disclosure. The invention itself, however, both as to organization and method of operation, may best be understood by reference to the detailed description which follows taken in conjunction with accompanying drawings in which.

DETAILED DESCRIPTION OF THE INVENTION

The exemplary embodiments are provided to illustrate aspects of the invention, but the invention is not limited to any embodiment. The scope of the invention encompasses numerous alternatives, modifications, and equivalents; it is limited only by the claims. Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured. As used herein, the singular forms "a", "an" and "the" designate both the singular and the plural, unless expressly stated to designate the singular only.

The present disclosure discloses a low noise reference voltage generator assisted by a digital electronics. An accurate low noise reference voltage is vital in precision analog applications therefore the digital assistance to analog integrated circuits minimizes the error sources and several non-idealities in the bandgap reference voltage generator in the CMOS technology without using an off-chip filters or techniques like chopping.

Figure 1:
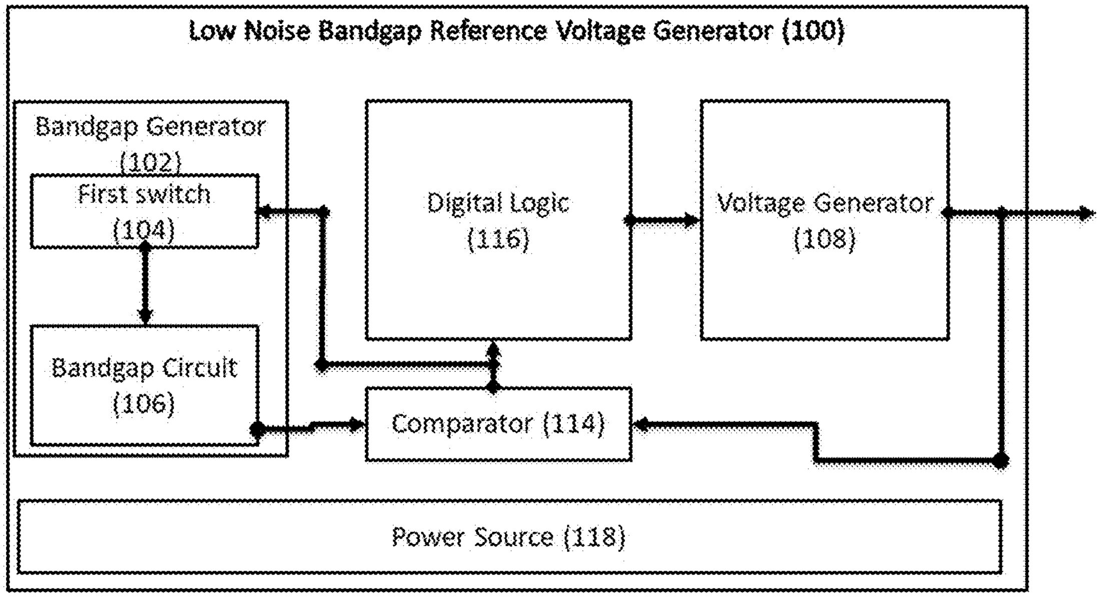
FIG. 1 depicts a low-noise bandgap reference voltage generator 100, according to one or more embodiments of the present invention.

FIG. 1 depicts a low-noise bandgap reference voltage generator 100, according to one or more embodiments of the present invention. The low noise reference voltage generator 100 (herein after known as the generator 100) is configured to generate a constant bandgap reference voltage. The generator 100 is configured to reduce the noise of bandgap reference voltage in semiconductor devices such as BJT circuits, MOSFET circuits, CMOS circuits, etc. In an embodiment, the generator 100 is configured to reduce the noise of bandgap reference voltage in the CMOS circuits. The generator 100 is configured to reduce the noise spectral density at various offset frequencies for generating the constant bandgap reference voltage. In an embodiment, the generator 100 is configured to reduce the noise spectral density up to 0.6 μV/√Hz at 1 Hz offset frequency for generating the constant bandgap reference voltage. The generator 100 is configured to maintain the accuracy of the bandgap in a range of temperature. In an embodiment, the generator 100 is configured to maintain the accuracy of the bandgap of 28 ppm/° C. in the temperature range of −20 to 125° C.

The generator 100 includes a bandgap generator 102, a voltage generator 108, a comparator 114, a digital logic 116, and a power source 118.

Figure 2:
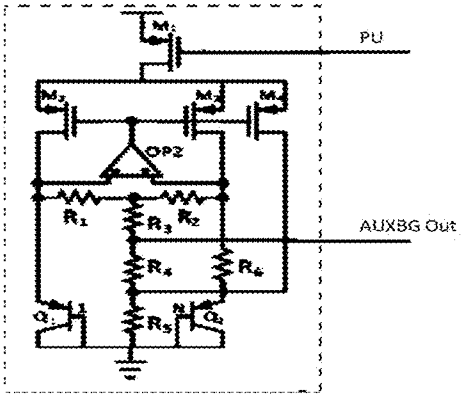
FIG. 2 depicts a circuit level diagram of a bandgap generator 102 of the low-noise bandgap reference voltage generator 100, according to one or more embodiments of the present invention.

The bandgap generator 102 is configured to provide a reference signal with the accuracy. In an embodiment, the bandgap generator 102 is configured to provide an AUXBG Out (as shown in FIG. 2) as the reference signal with an accuracy of the 28 ppm/° C. The bandgap generator 102 may be replaced with any other traditional bandgap generator, for example, a sub 1V bandgap reference circuit without loss of generality.

The bandgap generator 102 includes but not limited to a first switch 104, and a bandgap circuit 106. The first switch 104 is configured to be controlled by a controlling signal. The first switch 104 may be a BJT, MOSFET, etc. In an embodiment, the first switch 104 may be the MOSFET (M1) having a drain terminal D1, a source terminal S1 and a gate terminal G1 as shown in FIG. 2. In an embodiment, the first switch 104 is configured to be controlled by a controlling signal (PU) by applying the controlling signal to the gate terminal G1 of the MOSFET M1 as shown in FIG. 2. The first switch 104 is configured to be activated and deactivated for performing a switching operation such as ON and OFF, required for saving the power consumption of the generator 100.

The bandgap circuit 106 is electrically connected to the first switch 104. In an embodiment, the bandgap circuit 106 is electrically connected to the drain terminal D1 of MOSFET (M1). The bandgap circuit 106 is configured to provide a reference signal with accuracy. In an embodiment, the bandgap circuit 106 is configured to provide an AUXBG Out (as shown in FIG. 2) as the reference signal with an accuracy of the 28 ppm/° C.

The bandgap circuit 106 includes a plurality of transistor 106*a*, a plurality of first resistor 106*b* and an at least one first amplifier 106*c*.

The plurality of transistor 106*a* may be a MOSFET, BJT, etc. In an embodiment, the plurality of transistor 106*a* is a p-channel metal oxide semiconductors (PMOS) having drain terminal D, a source terminal S and a gate terminal G for example, M2 having D2, S2, G2, M3 having D3, S3, G3, and M4 having D4, S4, G4, and bipolar junction transistors (BJT) having an collector terminal C, an emitter terminal E and a base terminal B for example, Q1 having C1, E1, B1, and Q2 having C2, E2, B2 as shown in FIG. 2. The plurality of first resistor 106*b* includes but not limited to resistors for example, R1, R2, R3, R4, R5, and R6 as shown in FIG. 2. The at least one first amplifier 106*c* may be a high gain differential amplifier for example, an operational amplifier (OP2) as shown in FIG. 2. In an embodiment, the first switch 104 and the bandgap circuit 106 having the plurality of transistor 106*a*, the plurality of first resistor 106*b* and at least one amplifier 106*c* configured to form the bandgap generator 102 as shown in FIG. 2.

Figure 3:
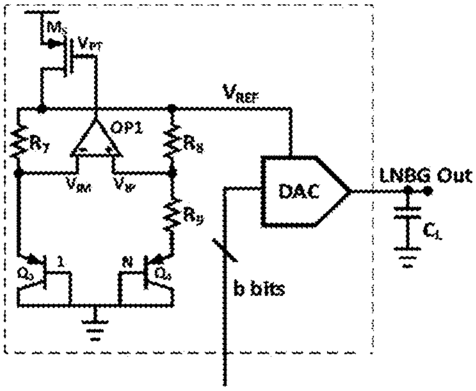
FIG. 3 depicts a circuit level diagram of a voltage generator 108 of the low-noise bandgap reference voltage generator 100, according to one or more embodiments of the present invention.

The voltage generator 108 is configured to generate the low noise bandgap reference voltage. In an embodiment, the voltage generator 108 is configured to generate a LNBG Out as the low noise bandgap reference voltage as shown in FIG. 3. The voltage generator 108 is configured to produce a complementary to absolute temperature (CTAT) voltage at a reference voltage. In an embodiment, voltage generator 108 is configured to produce a complementary to absolute temperature (CTAT) voltage at the reference voltage $V_{REF}$ as shown in FIG. 3.

The voltage generator 108 includes but not limited to a plurality of switching device 108*a*, an at least one second amplifier 108*b*, a plurality of second resistor 108*c*, and a data converter 108*d*.

The plurality of switching device 104*a* may be a BJT, a MOSFET etc. In an embodiment, the plurality of switching device 104*a* is BJT for example, Q3 having terminals (C3, E3, B3) and Q4 having terminals (C4, E4, B4) as shown in FIG. 3 with an emitter ratio (E3/E4) of 1:8 and a MOSFET for example, M5 having terminals (D5, S5, G5) as shown in FIG. 3.

The at least one second amplifier 108*b* may be a high gain differential amplifier having an output terminal 108*b*1, a first input terminal 108*b*2, and a second input terminal 108*b*3. In an embodiment, the at least one second amplifier 108*b* is an operational amplifier (OP1) having inverting terminal as first input terminal 108*b*2 and a non-inverting as the second input terminal 108*b*3. The at least one second amplifier 108*b* is configured to generate the difference between the corresponding voltages of the first terminal 108*b*2 and the second terminal 108*b*3. In an embodiment, the at least one second amplifier 108*b* is configured to generate the difference between the corresponding voltages of the second terminal 108*b*3 ($V_{IP}$) and the first terminal 108*b*2 (VIM). In an embodiment, the at least one second amplifier 108*b* is configured to create the difference between the emitter-base voltage ($V_{EB}$) of BJT Q3 and Q4 of plurality of switching device 104*a*, which is CTAT in nature.

The output at the output terminal 108*b*1 of the at least one second amplifier 108*b* is configured to be proportional to absolute temperature (PTAT) and create a low-impedance node at reference voltage (for example $V_{REF}$ as shown in FIG. 3) due to the global negative feedback loop.

Figure 4:
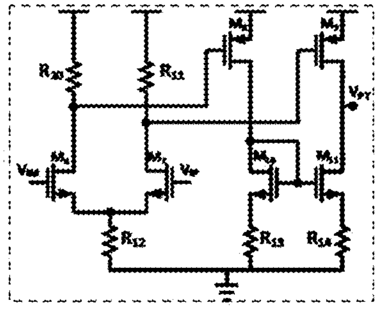
FIG. 4 depicts a circuit level diagram of an at least one second amplifier 108*b* of the low-noise bandgap reference voltage generator 100, according to one or more embodiments of the present invention.

The plurality of second resistor 110 may be a group of resistor for example, R7, R8, and R9 as shown in FIG. 3. In an embodiment, the output at the output terminal 108*b*1 of the at least one second amplifier 108*b* is configured to be proportional to absolute temperature (PTAT) to appear across R9 of the second resistor 110 as shown in FIG. 3. In an embodiment, the at least one second amplifier 108*b* is an op-amp OP1, includes a differential pair MOSFET M6 and M7 of the plurality of switching device 104*a* with resistors R10, and R11 of the plurality of second resistor 110 as load, followed by a common source gain stage M8, and M11 of the plurality of switching device 104*a* as shown in FIG. 4. The at least one second amplifier 108*b* is biased simply using a tail resistor as the systematic and random offsets are suppressed with the digital loop, eliminating a complex self-bias loop. The load transistors M10 and M11 of the plurality of switching device 104*a* as shown in FIG. 4 are further source degenerated with a resistor to yield a lower flicker noise. The at least one second amplifier 108*b* is configured to have a low input referred noise density as the majority of the noise contribution in the differential pair.

Figure 5:
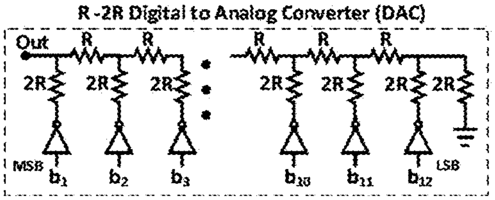
FIG. 5 depicts a circuit level diagram of a data convertor 112 of the low-noise bandgap reference voltage generator 100, according to one or more embodiments of the present invention.

The data convertor 112 may be a N bits digital to analog convertor for example, a R2R ladder DAC, a delta-sigma DAC, a multibit DAC, etc. driven using standard CMOS inverters. In an embodiment, the data convertor 112 may be the 12 bits R2R ladder DAC. In an embodiment, the R2R ladder is realized by using resistor (R) of value 20 kΩ as shown in FIG. 5.

The data convertor 108*d* is configured to utilize the low impedance created at the output terminal 108*b*1 of the at least one second amplifier 108*b* for a reference voltage and corresponding digital data (b) of bit size N of the control signal for generating the low noise bandgap reference voltage. In an embodiment, the data convertor 108*d* is configured to utilize the low impedance created at the output terminal 108*b*1 of the at least one second amplifier 108*b* for the $V_{REF}$ and the corresponding digital data (b) of bit size 12 of the controlling signal PU for generating the low noise bandgap reference voltage (LNBG Out) as shown in FIG. 3.

The data convertor 112 is configured to calibrate the output of the generator 100 based on corresponding digital data (b) of bit size N of the controlling signal. In an embodiment, the data convertor 112 is configured to calibrate the output of the generator 100 based on corresponding digital data (b) of bit size 12 of the controlling signal PU.

Figure 6:
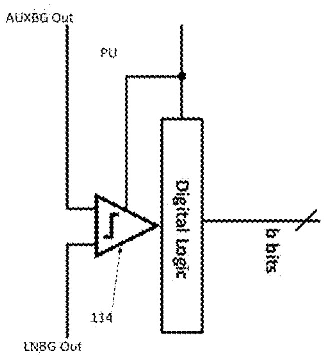
FIG. 6 depicts a comparator 114 of the low-noise bandgap reference voltage generator 100, according to one or more embodiments of the present invention.

The comparator 114 is configured to compare the reference signal generated by the bandgap circuit 106 of the bandgap generator 102 and the low noise bandgap reference voltage of the voltage generator 108 for generating the control signal. In an embodiment, the comparator 114 is configured to compare AUXBG Out as the reference signal generated by the bandgap circuit 106 of the bandgap generator 102 and LNBG Out as the low noise bandgap reference voltage of the voltage generator 108 for generating PU as the control signal as shown in FIG. 6. The comparator 114 may be an open loop operational amplifier, configured to generate a square wave based on the comparison of the reference signal and the low noise bandgap reference voltage.

The digital logic 116 is configured to generate the digital data (b) of bit size N for the corresponding received control signal generated by the comparator 114. In an embodiment, the digital logic 116 is configured to generate digital data (b) of 12 bits for the received PU as the control signal generated by the comparator 114. The digital logic 116 is configured to send the digital data (b) of N bits to the data converter 108*d* of the voltage generator 108.

The power source 118 is configured to power up the generator 100. The power source 118 may be a direct or alternating power source. In an embodiment, the power source 118 is a direct power source.

Figure 7:
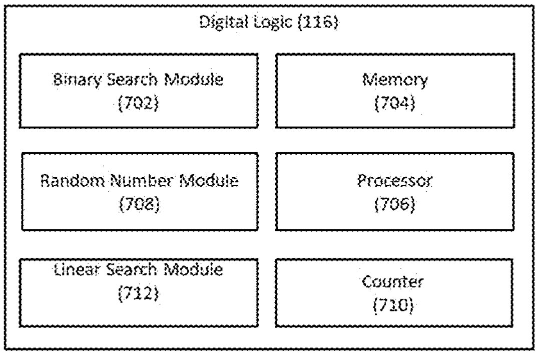
FIG. 7 depicts a digital logic 116 of the low-noise bandgap reference voltage generator 100, according to one or more embodiments of the present invention.

FIG. 7 depicts the digital logic 116 of the generator 100, according to one and more embodiments of the present disclosure. The digital logic 116 is configured to convert the received control signal, generated by the comparator 114 into corresponding digital data (b) of bits size N. In an embodiment, the digital logic 116 is configured to convert the received control signal PU, generated by the comparator 114 into corresponding digital data (b) of bits size 12. The digital logic 116 is configured to increase or decreases the value of the generated digital data (b) of bits size N linearly till the comparator 115 output is flipped. The digital logic 116 includes a binary search module 702, a memory 704, a processor 706, a random number module 708, a counter 710 and a linear search module 712.

The binary search module 702 is configured to perform a binary search on the digital data (b) of the received control signal generated by the comparator 114, stored in memory 704 using the processor 706 only once at the initial power-up the generator 100 when the output of the comparator 114 is significant. In an embodiment, the binary search module 702 is configured to perform a binary search only once at the initial power-up the generator 100 when the difference between reference signal for example AUXBG Out and the low noise voltage output for example LNBG voltages using the comparator 114 is significant. In an embodiment, the binary search module 702 is configured to provide 100 μs time for settling output of the bandgap generator 104 before performing the binary search.

The random number module 708 is configured to generate a random number. The random number module 708 is configured to start the counter 708 based on the generated random number, in response to that the counter 708 logic, powers up the bandgap generator 102 at random intervals. In an embodiment, the digital logic 116 counts to a random number them the bandgap generator 102 is powered.

The counter 708 is configured to count the numbers by using the processor 706. The counter 708 is configured to be reset when the count is equal to the random number generated by the random number module 708.

The linear search module 712 is configured to generate the digital data (b) of bit size N by performing the linear search on the digital data (b) of the received control signal generated by the comparator 114, stored in memory 704 using the processor 706 only when the bandgap generator 102 is power-up, enabling the counter 708 and the logic for the same. In an embodiment, the linear search module 712 is configured to perform a linear search when the difference between reference signal (AUXBG Out) and the low noise voltage output (LNBG) voltages using the comparator 114 is significant. In an embodiment, linear search module 712 is configured to provide 100 μs time for settling output of the bandgap generator 104 before performing the linear search.

Figure 8A:
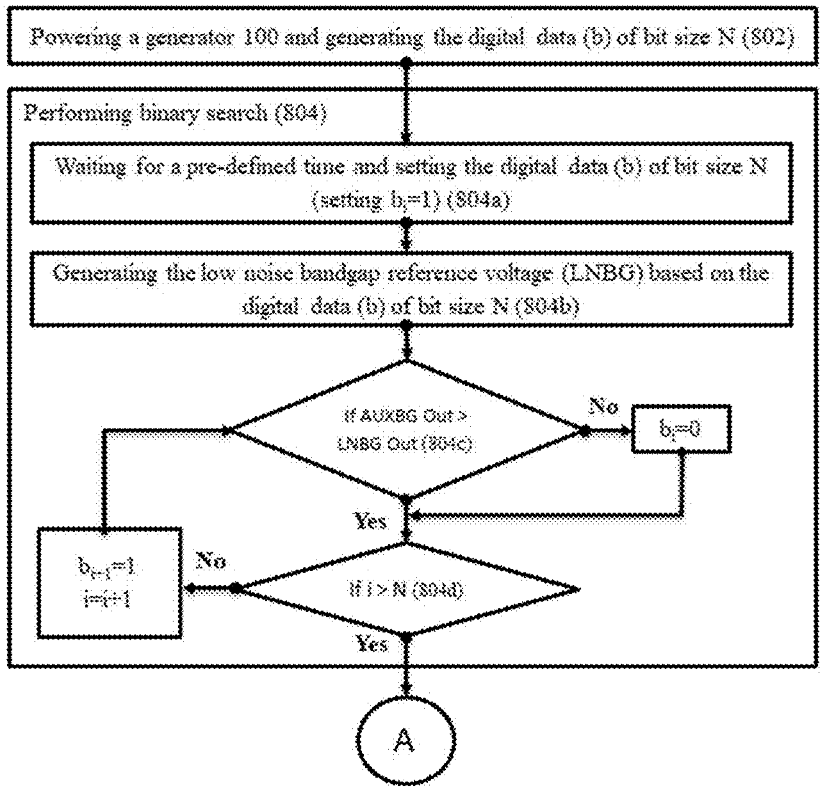
FIGS. 8A-8C depict a method 800 for low noise bandgap reference voltage generation using the generator 100, according to one or more embodiments of the present disclosure. In order to the manner in which the above-cited and other advantages and objects of the invention are obtained, a more particular description of the invention briefly described above will be referred to, which is illustrated in the appended drawing. It will be recognized by the person of ordinary skill in the art, given the benefit of this disclosure, that the examples/results shown in the figures are not necessarily drawn to scale.
Figure 8B:
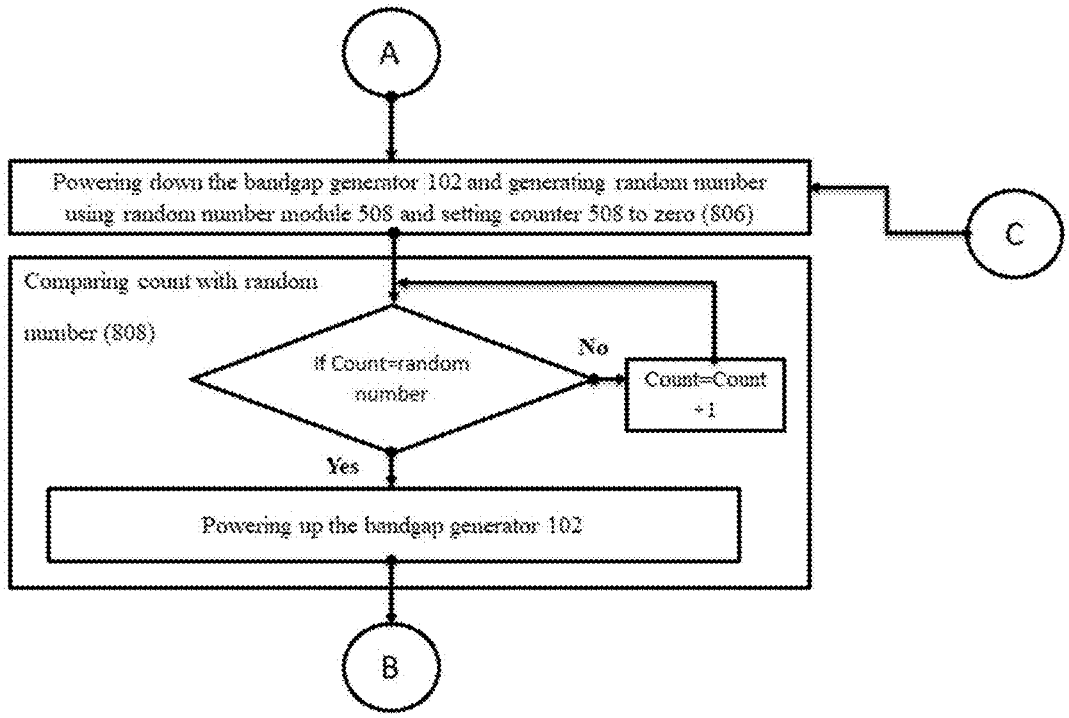
Figure 8C:
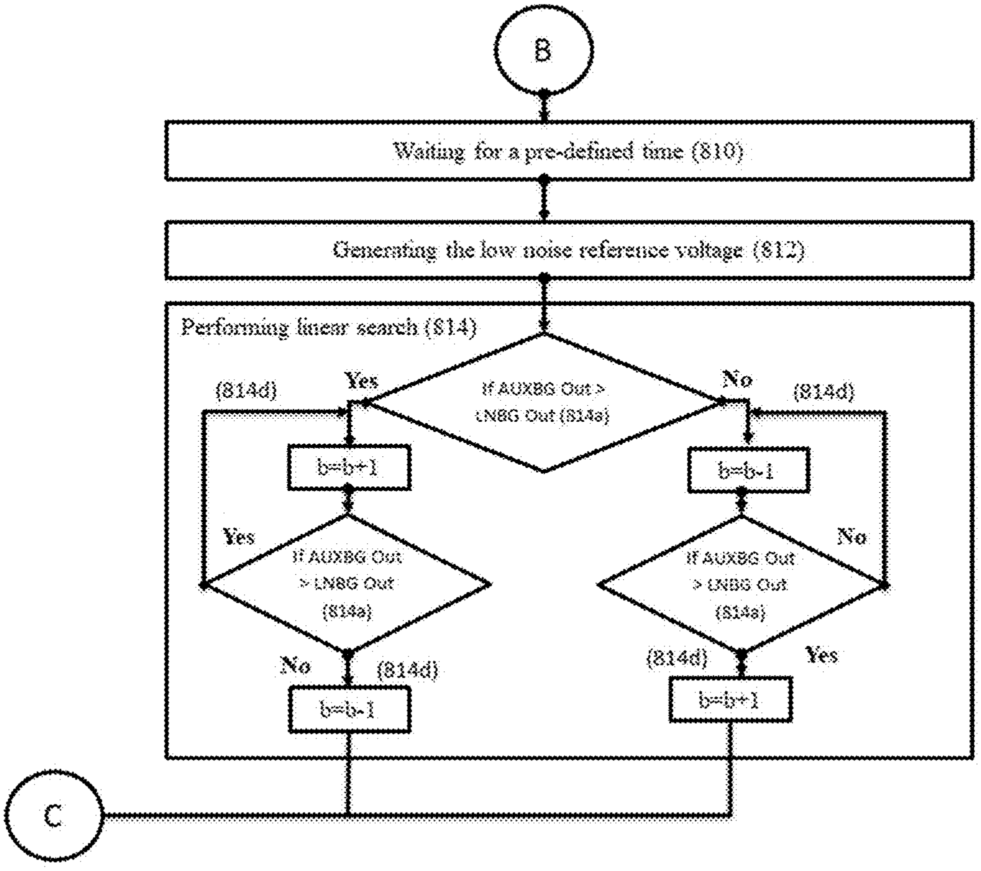

FIG. 8 depicts a method 800 for the low noise bandgap reference voltage generation using the generator 100, according to one or more embodiments of the present disclosure. The generator 100 is configured to generate the low noise bandgap reference voltage based on the reference voltage and the corresponding digital data (b) of bit size N of the control signal, includes but not limited to the following steps:

At step 802, the generator 100 is initially configured to be powered up by using the power source 118. The digital logic 114 of the generator 100 is configured to generate the digital data (b) of bit size N for control signal for example, $b_1b_2 \ldots b_i \ldots b_N$. In an embodiment, the digital logic 114 of the generator 100 is configured to generate the digital data (b) of bit size 12 for control signal PU for example, $b_1b_2 \ldots b_i \ldots b_{12}$ where $b_i$ denotes a $i^{th}$ bit of the digital data (b).

At step 804, the digital logic 116 of the generator 100 is configured to perform the binary search only once by using the binary search module 702, includes but not limited to the following sub-steps:

At step 804*a*, the binary search module 702 of the generator 100 is configured to wait for a pre-defined setup time for settling of the reference signal generated by the bandgap generator 102. In an embodiment, the binary search module 702 of the generator 100 is configured to wait for pre-defined setup time of 100 μs for settling of the reference signal generated by the bandgap generator 102. The binary search module 702 is configured to set the $i^{th}$ bit of the digital data of bit size N to a logic value based on the reference signal generated. In an embodiment, the generator 100 is configured to set the $i^{th}$ bit of the digital data (b) of bit size 12 to a default logic value of 1 for example $b_i=1$.

At 804*b*, the data converter 108*d* of the voltage generator 108 is configured to generate the low noise bandgap reference voltage based on the digital data (b) generated at step 804*a*. In an embodiment, the data converter 108*d* of the voltage generator 108 is configured to generate the LNBG Out based on the digital data (b) generated at step 804*a*.

At step 804*c*, the comparator 114 of the generator 100 is configured to compare the low noise bandgap reference voltage generated at the step 804*b* with the reference signal, generated by the bandgap generator 102 for generating the control signal. In an embodiment, the comparator 114 of the generator 100 is configured to compare the LNBG Out generated at the step 804*b* with the AUXBG Out, generated by the bandgap generator 102 for generating PU as the control signal. If the reference signal generated by the bandgap generator 102 is less than the low noise bandgap reference voltage generated of the voltage generator 108, then the $i^{th}$ bit of the digital data (b) of bit size N is configured to be reset to a logic value of 0 for example, $b_i=0$. If the reference signal generated by the bandgap generator 102 is greater than the low noise bandgap reference voltage generated of the voltage generator 108, then the $i^{th}$ bit of the digital data (b) of bit size N is configured to be same a set in the step 804*a* for example, $b_i=1$.

At step 804*d*, the binary search module 702 is configured to comparing the place of the bit generated at step 804*c* of the digital data (b) of bit size N. If the bit places, for example i of the bit $b_i$ is less than the bit size N then the binary search module 702 configured to set the bit $b_i$ to a logic value 1 and increase the place value of the bit of the digital data (b) of bit size N by 1. The binary search module 702 is configured to repeat the step 804*c*. If the bit places, for example i of the bit $b_i$ is greater than the bit size N then the binary search module 702 configured to perform the step 806.

At step 806, the bandgap generator 102 is configured to be powered down by using the processor 706. The random number module 708 of the digital logic 116 of the generator 100 is configured to generate the random number (R) based on the digital data (b) of bit size N. In an embodiment, the random number module 708 of the digital logic 116 of the generator 100 is configured to generate the random number (R) based on the digital data (b) of bit size 12. The counter 710 is configured to be reset to initial logic state. In an embodiment, the counter 710 is configured to be reset to initial logic state of 000000000000.

At step 808, the random number module 708 is configured to compare the generated random number (R) with the counter 710 current logic state (Count) by using the processor 706. If the counter 710 current logic state (Count) is similar as the random number (R) then the processor 706 is configured to power up the bandgap generator 102. If the counter 710 current logic state (Count) is dissimilar as the random number (R) then the counter 710 is configured to change the logic state to the next logic state by using the processor 706. In an embodiment, the counter 710 current logic state (Count) is dissimilar as the random number (R) then the counter 710 is configure to increase the logic state to the next logic state by 1 µsing the processor 706. The random number module 708 is configured to repeat the step 808.

At step 810, the generator 100 is configured to wait for a pre-defined setup time for settling of the reference signal generated by the bandgap generator 102. In an embodiment, the generator 100 is configured to wait for pre-defined setup time of 100 µs for settling of the reference signal generated by the bandgap generator 102.

At step 812, the data converter 108*d* of the voltage generator 108 is configured to generate the low noise bandgap reference voltage based on the digital data (b). In an embodiment, the data converter 108*d* of the voltage generator 108 is configured to generate the LNBG Out based on the digital data (b).

At step 814, the digital logic 116 of the generator 100 is configured to perform the linear search by using the linear search module 712, includes but not limited to the following sub-steps:

At step 814*a*, the linear search module 712 of the digital logic 116 of the generator 100 is configured to compare the low noise bandgap reference voltage generated at the step 812 with the reference signal, generated by the bandgap generator 102 by using the processor 706. In an embodiment, the linear search module 712 of the digital logic 116 of the generator 100 is configured to compare the LNBG Out generated at the step 812 with the AUXBG Out, generated by the bandgap generator 102 by using the processor 706. If the reference signal generated by the bandgap generator 102 is less than the low noise bandgap reference voltage generated of the voltage generator 108, then the digital logic 116 is configured to decrease the digital data (b) by one and the digital data (b) is configured to be fed to the step 806. The data converter 108*d* of the voltage generator 108 is configured to generate the low noise bandgap reference voltage based on the decreased digital data (b). In an embodiment, the data converter 108*d* of the voltage generator 108 is configured to generate the LNBG Out based on the decreased digital data (b). If the reference signal generated by the bandgap generator 102 is greater than the low noise bandgap reference voltage generated of the voltage generator 108, then the digital logic 116 is configured to increase the digital data (b) by one and the digital data (b) is configured to be fed to the step 806. The data converter 108*d* of the voltage generator 108 is configured to generate the low noise bandgap reference voltage based on the increased digital data (b). In an embodiment, the data converter 108*d* of the voltage generator 108 is configured to generate the LNBG Out based on the increased digital data (b).

At step 814*b*, the step 814*a* is configured to be repeated at least two times.

Although a preferred embodiment of the invention has been illustrated and described, it will at once be apparent to those skilled in the art that the invention includes advantages and features over and beyond the specific illustrated construction. Accordingly, it is indented that the scope of the invention is limited solely by the scope of the hereinafter appended claims, and not by the forgoing specification when interpreted in light of the relevant prior art.

I claim:

1. A low-noise bandgap reference voltage generator (100) for generating a constant bandgap reference voltage, comprising:

a. a bandgap generator (102) comprises:
  i. a first switch (104) configured to save a power consumption of the low-noise bandgap reference voltage generator (100), controlled by a controlling signal; and
  ii. a bandgap circuit (106) electrically connected to the first switch (104), configured to provide a reference signal;

b. a voltage generator (108) configured to, generate the low noise bandgap reference voltage, produce a complementary to absolute temperature (CTAT) voltage at a reference voltage;

c. a comparator (114) configured to compare the reference signal generated and the low noise bandgap reference voltage for generating the control signal;

d. a digital logic (116) configured to generate a digital data stored in a memory (704) using a processor (706), comprises:
  i. a binary search module (702) configured to perform a binary search on the digital data when the generator (100) initially powered;
  ii. a random number module (708) configured to generate a random number;
  iii. a counter (710) configured to count up to the random number and powered up the bandgap generator (102); and
  iv. a linear search module (712) configured to generate the digital data by performing the linear search on the digital data; and e. a power source (118) configured to power up the low-noise bandgap reference voltage generator (100).

2. The low-noise bandgap reference voltage generator (100) as claimed in claim 1, wherein the low-noise bandgap reference voltage generator (100) configured to, reduce the noise spectral density at offset frequency for generating the constant bandgap reference voltage, maintain the accuracy of the bandgap in the temperature range of −20° C. to 125° C.

3. The low-noise bandgap reference voltage generator (100) as claimed in claim 1, wherein the voltage generator (108) comprising a data converter (108*d*) configured to calibrate the low noise bandgap reference voltage by utilizing the reference voltage and digital data.

4. The low-noise bandgap reference voltage generator (100) as claimed in claim 1, wherein the digital logic (116) configured to convert the received control signal into digital data, and increase or decreases the value of the generated digital data linearly till the comparator (115) output flipped.

5. A method (800) for a low noise bandgap reference voltage generation comprising:

a. powering the generator (100) by using the power source (118);

b. performing a binary search by using the binary search module (702), comprises:

i. waiting for a pre-defined setup time for settling of the reference signal, and setting the $i^{th}$ bit of the digital data;

ii. generating the low noise bandgap reference voltage based on the digital data generated at step b(i);

iii. comparing the low noise bandgap reference voltage generated at the step b(ii) with the reference signal comprises:

1. for the reference signal less than the low noise bandgap reference voltage, the $i^{th}$ bit of the digital data configured to be reset; and 2. for the reference signal greater than the low noise bandgap reference voltage, the $i^{th}$ bit of the digital data configured to be set;

iv. comparing the place of the bit of the digital data generated at step b(iii)(2) with bit size N, comprises:

1. for bit place less than bit size then the binary search module (702) configured to set the bit of the bit place to a logic value one, increase the place value of the bit of the digital data by one, and repeat the step 804*c*; and 2. for bit place greater than bit size then the binary search module (702) configured to perform a step c;

c. powering down the bandgap generator (102), generating a random number based on the digital data, and resetting the counter (710) to initial state;

d. comparing the random number with the counter (710) current logic state, comprises:

i. for the counter (710) current logic state similar to the random number then powering up the bandgap generator (102); and ii. for the counter (710) current logic state dissimilar to the random number then the counter (710) configured to change the logic state to the next logic state and the random number module (708) configured to repeat the step d;

e. waiting for a pre-defined setup time for settling of the reference signal generated by the bandgap generator (102);

f. generating the low noise bandgap reference voltage based on the digital data; and g. performing the linear search by using the linear search module (712), comprises:

i. comparing the low noise bandgap reference voltage generated at the step f with the reference signal, comprises:

1. for the reference signal less than the low noise bandgap reference voltage then the digital logic (116) is configured to decrease the digital data by one, the digital data configured to be fed to the step c and the data converter (108*d*) configured to generate the low noise bandgap reference voltage based on the decreased digital data;

2. for the reference signal greater than the low noise bandgap reference voltage then the digital logic (116) configured to increase the digital data by one, the digital data configured to be fed to the step c, and the data converter (108*d*) configured to generate the low noise bandgap reference voltage based on the increased digital data; and ii. repeating the step g(i)(1) for at least two times.

6. The method (800) for a low noise bandgap reference voltage generation as claimed in claim 1, wherein the pre-defined setup time is of 100 μs for settling of the reference signal generated by the bandgap generator (102).

* * * * *